US009970781B2

(12) United States Patent
Christian et al.

(10) Patent No.: US 9,970,781 B2
(45) Date of Patent: May 15, 2018

(54) APPARATUS FOR THREE-AXIS IMU CALIBRATION WITH A SINGLE-AXIS RATE TABLE

(71) Applicant: West Virginia University, Morgantown, WV (US)

(72) Inventors: John A. Christian, Morgantown, WV (US); Drew E. Bittner, Greencastle, PA (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 283 days.

(21) Appl. No.: 15/057,658

(22) Filed: Mar. 1, 2016

(65) Prior Publication Data

US 2017/0199054 A1  Jul. 13, 2017

Related U.S. Application Data

(60) Provisional application No. 62/127,493, filed on Mar. 3, 2015.

(51) Int. Cl.
*G01C 25/00* (2006.01)

(52) U.S. Cl.
CPC .................... *G01C 25/00* (2013.01)

(58) Field of Classification Search
CPC .............................. G01C 25/00; G01C 25/005
See application file for complete search history.

(56) References Cited

U.S. PATENT DOCUMENTS

| 2,539,713 | A | * | 1/1951 | Wilkenson | G01C 25/005 318/675 |
| 2,761,306 | A | * | 9/1956 | McNutt | G01C 25/005 73/1.78 |
| 3,143,893 | A | * | 8/1964 | Jorgensen | G01C 21/18 33/323 |
| 3,164,978 | A | * | 1/1965 | Sharman | G01C 25/005 73/1.77 |

(Continued)

FOREIGN PATENT DOCUMENTS

CN          103278177 A         9/2013

OTHER PUBLICATIONS

Aggarwal, P., et al., A Standard Testing and Calibration Procedure for Low Cost MEMS Inertial Sensors and Units, The Journal of Navigation (2008), vol. 61, pp. 323-336.

(Continued)

*Primary Examiner* — David Bolduc
(74) *Attorney, Agent, or Firm* — Thomas | Horstemeyer, LLP

(57) ABSTRACT

Various methods and apparatuses are provided for calibrating a three-axis IMU sensor package using a single-axis rate table. In one embodiment, a method includes adjusting an x-axis position of a sensor by rotating an inner assembly along the circumference of the inner surface of the circular frame, adjusting a y-axis position of the sensor by rotating a portion of the inner assembly, spinning the single-axis rate table to generate z-axis rotation of the apparatus which results in simultaneous stimulation of all three axes of the sensor assembly, and obtaining measurements from the sensor corresponding to the x-axis position, the y-axis position, and the z-axis rotation of the apparatus.

20 Claims, 10 Drawing Sheets

(56) References Cited

U.S. PATENT DOCUMENTS

| | | | | |
|---|---|---|---|---|
| 3,253,472 A * | 5/1966 | Klemes | G01C 25/00 | 33/318 |
| 3,508,832 A * | 4/1970 | Schroeder | G01C 25/00 | 356/138 |
| 3,583,205 A * | 6/1971 | Erle | F16C 32/0622 | 384/100 |
| 3,584,513 A * | 6/1971 | Gates | G01C 19/02 | 73/504.18 |
| 3,795,784 A * | 3/1974 | Moll | G01C 25/005 | 219/121.62 |
| 3,935,746 A * | 2/1976 | Moll | G01C 25/005 | 73/462 |
| 4,028,524 A * | 6/1977 | Moll | B23K 26/0823 | 219/121.69 |
| 4,583,178 A * | 4/1986 | Ameen | G01C 25/005 | 244/3.2 |
| 6,209,383 B1 * | 4/2001 | Mueller | G01C 19/72 | 73/1.37 |
| 6,234,799 B1 | 5/2001 | Lin | | |
| 7,030,968 B2 * | 4/2006 | D'Aligny | G01B 11/002 | 356/139.1 |
| 8,527,228 B2 | 9/2013 | Panagas | | |
| 9,091,606 B2 * | 7/2015 | Fitz-Coy | B64G 1/286 | |
| 2002/0134154 A1 * | 9/2002 | Hsu | G01C 19/5719 | 73/504.04 |
| 2003/0084704 A1 * | 5/2003 | Hanse | G01C 25/005 | 73/1.38 |
| 2003/0115930 A1 * | 6/2003 | Kappi | G01C 19/56 | 73/1.37 |
| 2006/0090357 A1 * | 5/2006 | Wuersch | G01C 15/004 | 33/290 |
| 2006/0191148 A1 * | 8/2006 | Lippuner | G01C 1/02 | 33/290 |
| 2007/0032951 A1 * | 2/2007 | Tanenhaus | G01C 21/16 | 702/151 |
| 2007/0277586 A1 * | 12/2007 | Kamiya | G01P 15/18 | 73/1.38 |
| 2008/0115562 A1 * | 5/2008 | Haino | G01C 25/005 | 73/1.37 |
| 2008/0210025 A1 * | 9/2008 | Goossen | F16M 11/041 | 74/5.34 |
| 2010/0024560 A1 * | 2/2010 | Shcheglov | G01C 19/5684 | 73/649 |
| 2011/0077891 A1 | 3/2011 | Koenig | | |
| 2011/0202300 A1 * | 8/2011 | Udagawa | G01B 21/045 | 702/95 |
| 2012/0130667 A1 * | 5/2012 | Fukushima | G01C 19/00 | 702/96 |
| 2012/0203487 A1 | 8/2012 | Johnson et al. | | |
| 2014/0372063 A1 | 12/2014 | Niu et al. | | |
| 2015/0121989 A1 * | 5/2015 | Orzechowski | G01C 25/00 | 73/1.38 |
| 2016/0223357 A1 * | 8/2016 | Frey, Jr. | G01C 25/005 | |

OTHER PUBLICATIONS

Wang, et al., "Intelligent Calibration Method of Low Cost MEMS Inertial Measurement Unit for an FPGA-based Navigation System," International Journal of Intelligent Engineering & Systems, vol. 4, No. 2, 2011.

Bittner D. Christian, et al., "Development of Alignment Technique for a Large Number of Redundant Inertial Measurement Units," 65th International Astronautical Congress, Toronto, Canada, IAC-14-C1.5.8, 2014.

Drew E. Bittner, "Advances in MEMS IMU Cluster Technology for Small Satellite Applications," Thesis submitted to The Benjamin M. Statler College of Engineering and Mineral Resources of West Virginia University, Morgantown, WV, 2015.

Jixin Lv, et al. "A Method of Low-Cost IMU Calibration and Alignment," Proceedings of the 2016 IEEE/SICE International Symposium on System Integration, Sapporo Convention Center, Sopporo, Japan, Dec. 13-15, 2016, pp. 373-378.

Sitank Bhatia, et al., "Development of an Analytical Method of IMU Calibration," 13th International Multi-Conference on Systems, Signals, Devices, pp. 131-135, 2016.

* cited by examiner

APPARATUS FOR THREE-AXIS IMU CALIBRATION WITH A SINGLE-AXIS RATE TABLE

CROSS-REFERENCE TO RELATED APPLICATIONS

This application claims priority to U.S. Provisional Application No. 62/127,493 filed on Mar. 3, 2015 and entitled "APPARATUS FOR THREE-AXIS IMU CALIBRATION WITH A SINGLE-AXIS RATE TABLE," which is incorporated herein by reference in its entirety.

STATEMENT REGARDING FEDERALLY SPONSORED RESEARCH OR DEVELOPMENT

This invention was made with Government support under Contract/Grant No. NNX13AQ79A awarded by NASA. The Government has certain rights in this invention.

BACKGROUND

Inertial Measurement Units (IMUs) are sensor packages that typically contain three-axis gyroscopes and three-axis accelerometers to measure the change in acceleration and orientation of a vehicle or other object along different axes. A three-axis IMU measures the acceleration and rotation along all three axes. Three-axis IMUs are widely used in a variety of applications ranging from navigation, machining, robotics, industrial equipment, aerospace, defense, consumer electronics, and testing apparatus. In navigation applications, IMUs are used for GPS-denied and GPS-assisted navigation of manned and unmanned aircraft, spacecraft, and surface, marine, and underwater vehicles. For machining and for robotics applications, IMUs are used for tracking the motion of components and systems with respect to a reference frame. Several consumer electronics devices such as smartphones, gaming controllers and fitness products have incorporated IMUs for tracking motion. In addition, IMUs may be made for aerospace applications include tracking of satellites, missiles and other high-accuracy requirements. Accordingly, IMUs need to be calibrated to the desired level of accuracy since the IMU calibrations are critical for the effective practical use of an IMU. Such calibration requires the ability to stimulate the sensor with precisely controlled and repeatable inertial motion.

SUMMARY

Included are various embodiments of apparatuses and methods related to calibrating an IMU sensor package using a single-axis rate table. One embodiment of an apparatus, among others, includes a mounting apparatus for calibrating a three-axis IMU sensor package using a single-axis rate table, the mounting apparatus comprising a circular frame; an inner assembly slidably coupled to the circular frame and extending along a diameter of the circular frame, where the inner assembly is configured to secure the IMU sensor package, and rotation of the inner assembly about an inner circumference of the circular frame corresponds to an x-axis position of the IMU sensor package; and a bracket mount attached to a portion of the circular frame, the bracket mount being configured for mounting the mounting apparatus onto the single-axis rate table.

Another embodiment is a method, among others, that includes the following steps: attaching a mounting apparatus comprising a sensor to a single-axis rate table; adjusting an x-axis position of the sensor by rotating an inner assembly along a circumference of a circular frame of the mounting apparatus, the sensor being mounted to the inner assembly; adjusting a y-axis position of the sensor by rotating a portion of the inner assembly, the sensor being coupled to the portion of the inner assembly; spinning the single-axis rate table to generate z-axis rotation of the mounting apparatus and stimulating a combination of the x-axis, y-axis, and z-axis of the sensor based at least in part on the x-axis position, the y-axis position, and the z-axis rotation.

Another embodiment of an apparatus, among others, includes an apparatus for calibrating a three axis IMU sensor package on a single-axis rate table, the apparatus comprising: means for rotating the IMU sensor package along an x-axis; means for rotating the IMU sensor package along a y-axis; and means for mounting the IMU sensor package to the single-axis rate table, the rotation of the IMU sensor package coinciding with rotation of the single axis.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
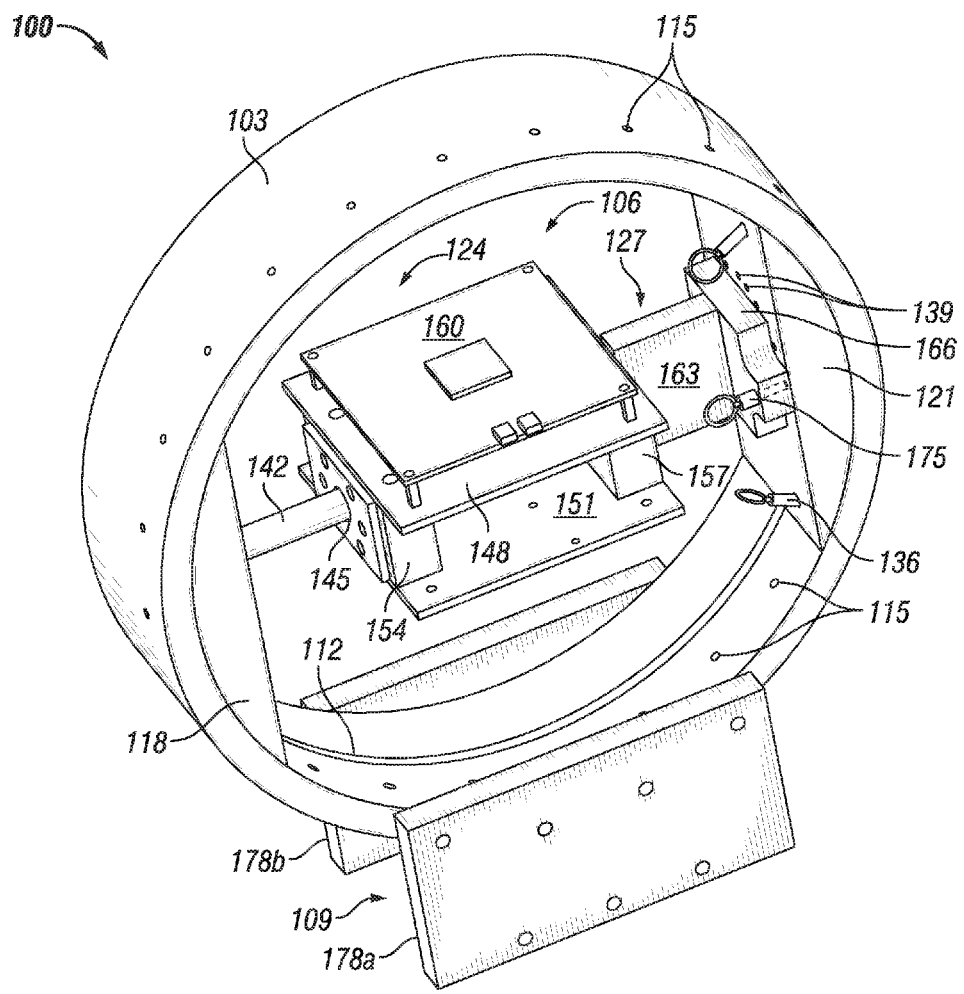
FIG. 1 is a drawing of an example of a perspective view of a mounting apparatus according to various embodiments of the present disclosure.

Disclosed herein are various embodiments of apparatuses and methods related to calibrating a three-axis inertial measurement unit (IMU) using a single-axis rate table for repeatable calibrations at different orientations with minimal user intervention. Specifically, disclosed herein is a mounting apparatus for the IMU sensor package that allows for the adjustment of the orientation along all three-axis without removal of the sensor package. In various embodiments, the mounting apparatus can be mounted onto a single-axis rate table to perform repeatable calibration of all three axes of the IMU, thereby reducing the cost and size of a typical three-axis IMU calibration apparatus. Further, according to various embodiments of the present disclosure, the mounting apparatus can place an IMU sensor package in different, repeatable orientations, such that a three-axis calibration may be performed using only a single-axis rate table.

There are several known methods for calibrating multi-axis IMUs. One known method of calibrating three-axis IMUs is by using a two-axis or three-axis rate table where multi-axis motion profiles may be reconstructed accurately. By using this method, all axes can be properly measured or spun during calibration simultaneously. Simultaneously stimulating the IMU along all three axes can yield information about errors between axes. This method is fast because a single programmed run of a multi-axis table can yield all the necessary measurements needed for a proper calibration. As such, this method is capable of calibrating the error between the axes, and improving the speed of the calibration by providing all the necessary calibration measurements in just a few programmed movements. However, these benefits come at a significant cost due to the substantial price difference between the cost of a three-axis rate table and the cost of a single-axis rate table. Other disadvantages include the cost of programming precise motion profiles and the extra lab space needed for a multi-axis rate table.

Another method of calibrating an IMU is to use a six-point tumble test where the sensor package is mounted on a leveled surface along each of the three axes alternately pointing up and down. Specifically, calibrating the IMU with this method involves placing the IMU in six different positions (each axis pointing up and down while spinning on a single axis rate table). For example, a user may place the IMU on the single-axis rate table with the x-axis pointing up, spin the IMU at a known rate, and collect the corresponding measurements. Next, the IMU is flipped 180 degrees with the x-axis pointing down, and the rate-table is spun once again to collect measurements at the new position. This process is repeated two more times (four more measurements) for the other two axes (y and z). As can be observed, the IMU must be physically handled during the calibration and flipping the axis at an exact 180 degrees can be quite troublesome. Because this calibration does not yield angled measurements, no information can be taken about errors between axes (misalignment and non-orthogonality errors). Therefore, a separate calibration must be performed to estimate these errors. As such, this calibration method is not only time-consuming, but also non-repeatable.

Another known way to calibrate a three-axis IMU is by mounting the sensor package at different angles on a single-axis rate table to calibrate the error between the axes. This is analogous to the six-point tumble test with some additional intermediate points to provide information on the error between the axes. In one implementation of this technique, angled blocks may be used for changing the mounting angle. However, the drawbacks of this method are the cost of machining angled blocks of different sizes, the repeatability of measurements as a result of remounting the sensor for every angle, and the time to change the blocks between measurements. In addition, the use of angled brackets may cause additional issues such as, for example, noticeable play in adjustments leading to repeatability issues, non-repeatable positions due to imprecise adjustments, a need for special tools for the adjustments, and inability for z-axis adjustments without removal of the sensor.

The present disclosure overcomes the limitations of the previously mentioned techniques. The key advantages of the mounting apparatus and methods disclosed herein as opposed to other single-axis rate table techniques are repeatability, cost, time, ease of repositioning, and minimization of user intervention. Further, the main advantages of the present disclosure with respect to using multi-axis rate tables is a large reduction in the cost and size of equipment and an elimination of the need for programming complicated motion profiles.

Reference will now be made in detail to the description of the embodiments as illustrated in the drawings, wherein like reference numbers indicate like parts throughout the several views.

Referring now to FIG. 1, shown is an example of a drawing of a perspective view of a mounting apparatus 100 according to various embodiments of the present disclosure. The mounting apparatus 100 comprises a circular frame 103, an inner assembly 106, and a table mounting bracket 109. In various embodiments, the circular frame 103 can be ring-shaped having an inner surface and an outer surface. The circular frame 103 further comprises an inner guide slot 112 recessed along the circumference of the inner surface of the circular frame 103 and a plurality of x-rotation holes 115 spaced along the circumference of the circular frame 103 and extending from the outer surface to the inner surface of the circular frame 103. The x-rotation holes 115 are configured to allow for rotation of the inner assembly 106 along the x-axis. In some embodiments, the x-rotation holes are uniformly spaced along the circumference of the circular frame 103. For example, the x-rotation holes 115 may be spaced at fifteen degree increments, twenty degree increments, and/or any other variation of incremental spacing along the circumference of the circular frame 103. In other embodiments, the spacing of the x-rotation holes 115 along the circumferences of the circular frame 103 may be non-uniformly spaced.

In some embodiments, the inner assembly 106 can be slidably attached to the inner surface of the circular frame 103 extending along the diameter of the inner surface of the circular frame 103. In various embodiments, the inner assembly 106 comprises a first slide member 118, a second slide member 121, a sensor mount assembly 124, and a y-axis assembly 127. The first slide member 118 and the second slide member 121 are positioned at opposing ends of the inner assembly 106. Accordingly, when the first slide member 118 is positioned along one portion of the inner surface of the circular frame 103, the second slide member 121 is positioned along an opposite portion of the inner surface of the circular frame 103.

In some embodiments, the first slide member 118 and the second slide member 121 are semi-circle shaped and comprise a convex surface and a substantially flat surface. The convex surface is shaped to follow the curvature of the inner surface of the circular frame 103. In other embodiments, the first slide member and the second slide member 121 may comprise other shapes (e.g., rectangular, square, circular, etc.) so long as the first slide member 118 and second slide member 121 comprise a surface shaped to move along the interior circumference of the circular frame 103 as can be appreciated.

The first slide member 118 and the second slide member 121 each comprise a male slot 130 (FIGS. 4A and 4B) extending outwardly from the respective convex surface such that the male slot 130 on each slide member 118,121 engages with the inner guide slot 112 recessed within the inner surface of the circular frame 103. Once engaged with the inner guide slot 112, the first slide member 118 and the second slide member 121 can move along the interior circumference of the circular frame 103.

In various embodiments, the first slide member 118 and the second slide member 121 can each comprise one or more x-mounting holes 133 (FIGS. 4A and 4B) for placement of one or more x-mounting pins 136 used to secure the respective slide member 118, 121 to a desired position along the circular frame 103. The x-mounting holes 133 are configured to align with a respective x-rotation hole 115 such that a respective x-mounting pin 136 may be inserted into a respective x-mounting hole 133 and through a respective x-rotation hole 115 to secure placement of the respective slide member 118, 121 to the circular frame 103. The one or more x-mounting pins 136 may comprise a locking pin and/or any other suitable connector that can be used to secure placement of the first slide member 118 and/or the second slide member 121 to the circular frame 103. Accordingly, rotation of the inner assembly 106 along the x-axis is capable via the adjustments and placement of the first slide member 118 and the second slide member 121 along the inner surface of the circular frame 103. In some embodiments, a respective x-mounting pin 136 may be used to secure both the first slide member 118 and the second slide member 121. In other embodiments, the one or more x-mounting pins 136 are inserted into either the first slide member 118 or the second slide member 121.

The second slide member 121 differs from the first slide member 118 in that the second slide member 121 further comprises a plurality of y-rotation holes 139 disposed in a circular configuration on the substantially flat portion of the second slide member 121. In some embodiments, the plurality of y-rotation holes 139 are evenly spaced in a circular configuration. For example, while the y-rotation holes 139 are spaced at about fifteen degree increments in FIG. 1, the degree increments between the y-rotation holes 139 may be spaced at greater or lesser degrees. In other embodiments, the y-rotation holes 139 are not spaced evenly. The y-rotation holes 139 are disposed along the second slide member 121 to allow for rotation of the sensor mount assembly 124 along the y-axis.

The first slide member 118 is connected to a first end of the sensor mount assembly 124 via a shaft 142 extending outwardly from and substantially perpendicular to the substantially flat surface of the first slide member 118. The shaft 142 comprises a first end connected to the first slide member 118 and a second end that is coupled to the sensor mount assembly 124 via a first ball bearing 145 that allows for rotation of the sensor mount assembly 124 about the y-axis of the shaft 142.

The sensor mount assembly 124 comprises a top plate 148, a bottom plate 151, a first side 154, and a second side 157. The top plate 148 is configured to secure the IMU sensor package 160 to the sensor mount assembly 124. The IMU sensor package 160 may be connected to the top plate 148 by brackets, screws, an adhesive, and/or any other appropriate type of connector to securely mount the IMU sensor package 160 to the top plate 148. The bottom plate 151 is positioned substantially parallel and below the top plate 148. Although the top plate 148 and the bottom plate 151 of the sensor mount assembly 124 of FIG. 1 are shown as being rectangular-shaped, the shapes of the top plate 148 and the bottom plate 151 may be circular, triangular, pentagonal, octagonal and/or any other appropriate type of shape. Further, the size and shape of the sensor mount assembly 124 of FIG. 1 may be customized for different shaped and sized IMU sensor packages 160.

The first side 154 of the sensor mount assembly 234 is disposed between the top plate 148 and the bottom plate 151 and comprises a first ball bearing 145 that is disposed along the second end of the shaft 142 extending from the first slide member 118. The second side 157 of the sensor mount assembly 124 is opposite of the first side of the sensor mount assembly 124 and disposed between the top plate 148 and the bottom plate 151.

The y-axis assembly 127 is disposed between the second side 157 of the sensor mount assembly 124 and the second slide member 121. In some embodiments, the y-axis assembly 127 comprises a first member 163 coupled to a second member 166. In some embodiments, the y-axis assembly 127 is t-shaped configuration. The first member 163 of the y-axis assembly 127 is coupled to the second side 157 of the sensor mount assembly 124. The second member 166 of the y-axis assembly 127 is rotationally coupled to the substantially flat surface of the second slide member 121 via a second ball bearing 169 such that the second member 166 can rotate along the y-axis in a full 360 degree rotation. The second member 166 of the y-axis assembly 127 comprises a y-mounting hole 172 that is configured to align with a respective y-rotation hole 139 of the second slide member 121. The position of the second member 166 along the y-axis is secured in place by a y-mounting pin 175 inserted in the y-mounting hole 172 and into the respective y-rotation hole 139 of the second slide member 121.

According to various embodiments, when the y-mounting pin 175 is removed and/or unlocked, the y-axis assembly 127 (and sensor mount assembly 124) may be rotated along the y-axis in a full 360 degree rotation. The y-mounting pin 175 may comprise a locking pin and/or any other connector that can secure the position of the y-axis assembly 127 along the y-axis. Accordingly, the position of the y-axis assembly 127 along the y-axis can be rotated along the y-axis based at least in part on a respective y-mounting hole 172 location. In addition, the one or more x-mounting pins 136 and the y-mounting pin 175 are independent from one another, adding to the versatility of the mounting apparatus 100.

The table mount bracket 109 is coupled to a portion of the circular frame 103. The table mount bracket 109 may comprise one or more side brackets 178 (e.g., 178a, 178b) coupled to at least one side of the portion of the circular frame 103. The table mount bracket 109 may further comprise a bottom bracket 181 (FIG. 2) disposed between the one or more side brackets 178. The bottom bracket 181 may be used to mount the mounting apparatus 100 to a single-axis rate table (not shown). The size and shape of the table mount bracket 109 may be customized for various types of rate tables. The rotation of the mounting apparatus 100 about the z-axis coincides with rotation along the axis of the rate table.

When assembled, the mounting apparatus 100 may be used to adjust the position of a mounted IMU sensor package 160 at various orientations along the three axes to allow for three-axis calibration. For example, using the configuration shown in FIG. 1, the x-rotation holes 115 are uniformly spaced every fifteen degrees to allow for rotation of the inner assembly 106 to twenty-four discrete positions along the full 360 degree orientation along the x-axis using the x-mounting pins 136 that are inserted through respective x-mounting holes 133 in the first slide member 118 and/or the second slide member 121 into the one or more x-rotation holes 115 of the circular frame 103.

In the configuration shown in FIG. 1, the y-rotation holes 139 are uniformly spaced at fifteen degree increments to allow for rotation of the inner assembly 106 to twenty-four discrete positions along the full 360 degree orientation along the y-axis. Specifically, the orientation of the sensor mount assembly 124 along the y-axis may be rotated and secured by aligning the y-mounting hole 172 with a respective y-rotation hole 139 and inserting the y-mounting pin 175 through the y-mounting hole 172 and respective y-rotation hole 139. In one non-limiting example, using the example configuration as shown in FIG. 1, the mounting apparatus 100 of FIG. 1 allows for 576 unique orientations at fifteen degree increments along the three axes.

In some embodiments of the mounting apparatus, the x-axis and y-axis orientations are adjusted manually. In other embodiments, the mounting apparatus 100 may further comprise one or more motor devices (not shown) and/or controller devices (not shown) that are configured to automatically adjust the x-axis orientation and/or the y-axis orientation as can be appreciated. For example, the inner assembly 106 may comprise a motor, a controller, and/or other appropriate devices that allow for the inner assembly 106 to automatically change orientation by automatically aligning the x-mounting holes 133 with respective x-rotation holes 115 and secure the position by automatically inserting a x-mounting pin 136 through the x-mounting holes 133 and into the x-rotation holes 115. Similarly, the y-axis orientation of the sensor mount assembly 124 may be adjusted automatically as can be appreciated.

Figure 2:
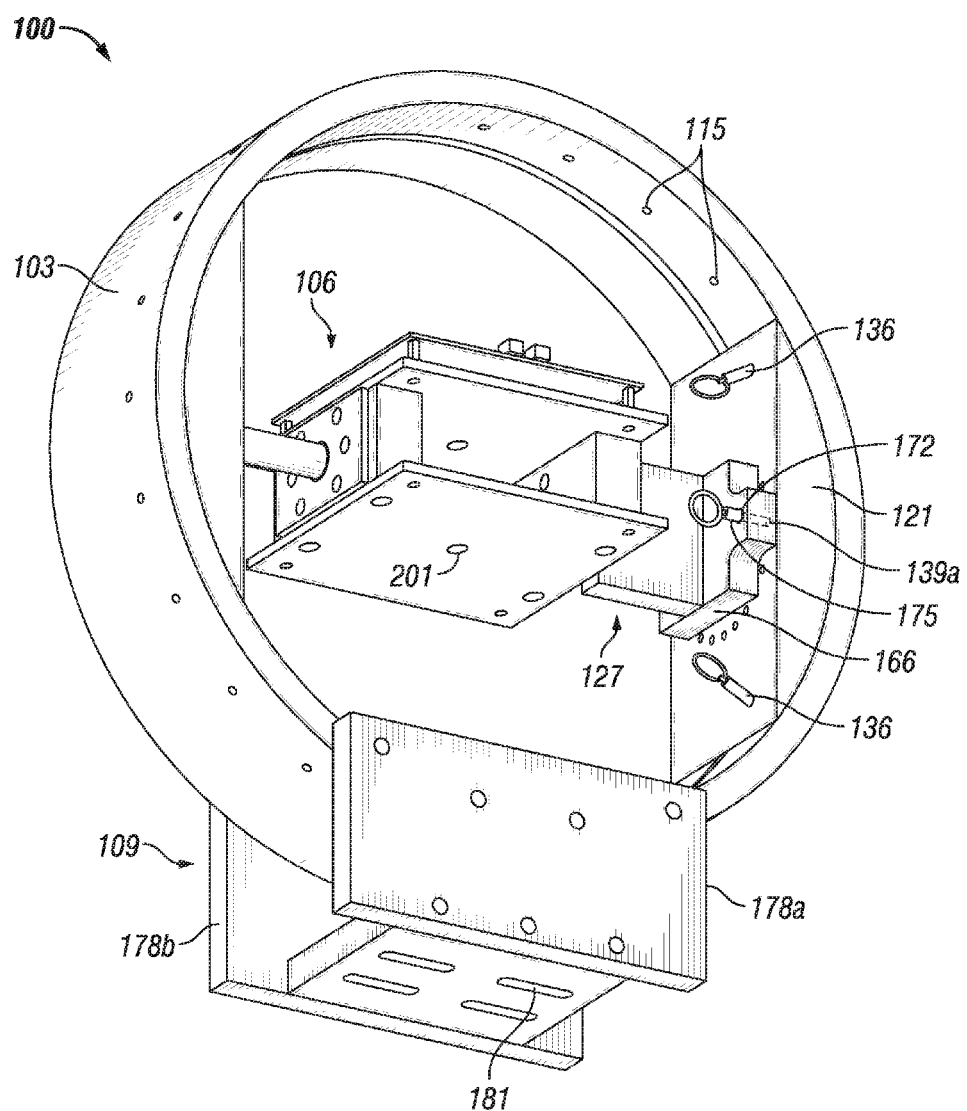
FIG. 2 is a drawing of an example of another perspective view of the mounting apparatus of FIG. 1 according to various embodiments of the present disclosure.

Turning now to FIG. 2, shown is an example of a drawing of another perspective view of the mounting apparatus 100 according to various embodiments of the present disclosure. In FIG. 2, the inner assembly 106 is secured to the circular frame 103 via the one or more x-mounting pins 136 inserted into the x-mounting holes 133 of the second slide member 121. In addition, the y-axis assembly 127 is secured to a specific position along the y-axis defined by the y-mounting pin 175 being inserted into the y-mounting hole 172 at a respective y-rotation hole 139a on the second slide member 121.

In FIG. 2, the bottom plate 151 of the sensor mount assembly 124 is shown. In some embodiments, the bottom plate 151 may comprise at least one tapped hole 201 configured to receive one or more weights that may be used to compensate for sensor weight to maintain the appropriate center of gravity. FIG. 2 also shows the bottom bracket 181 of the table mounting bracket 109. As previously noted, the bottom bracket 181 may be customized for mounting onto a variety of rate tables.

Figure 3:
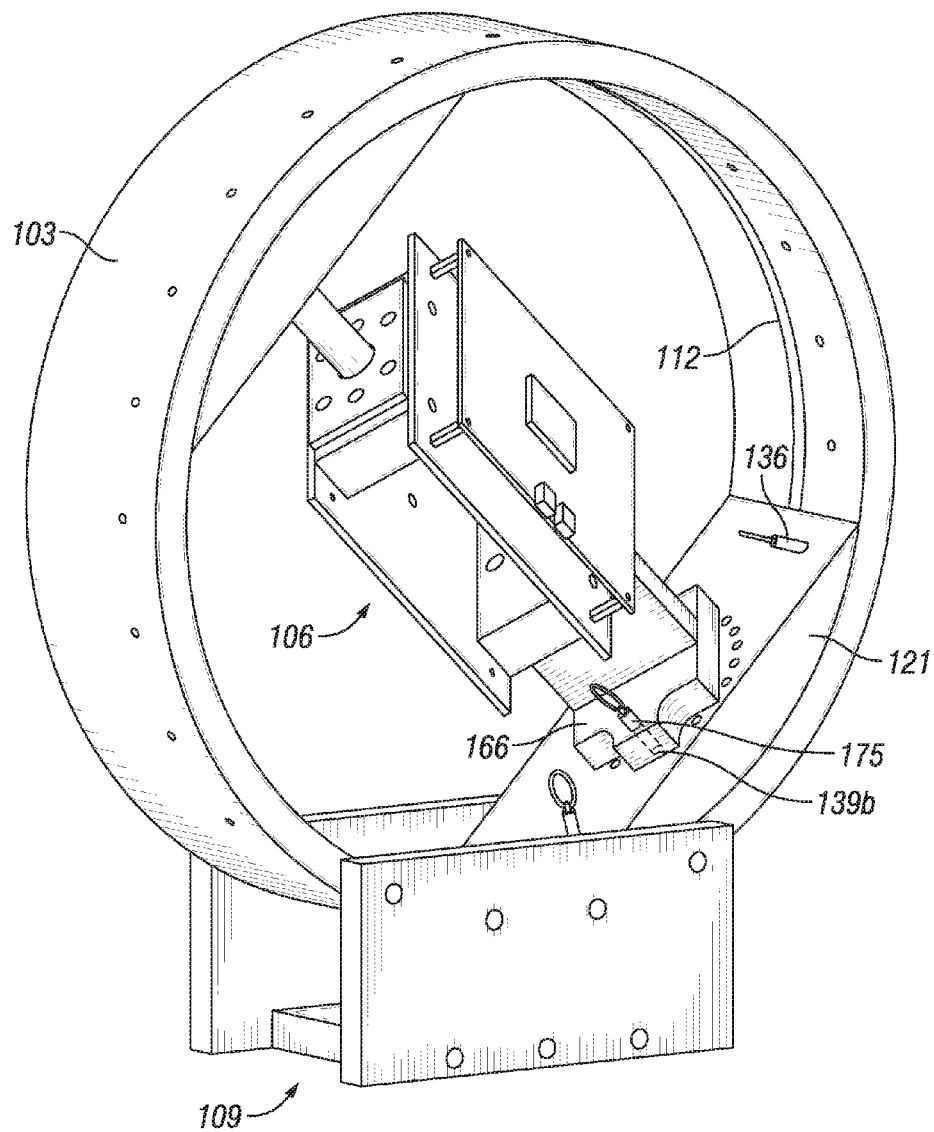
FIG. 3 is a drawing of an example of a perspective view of the mounting apparatus of FIG. 1 where the inner assembly has been rotated about the x-axis and the y-axis according to various embodiments of the present disclosure.

Moving on to FIG. 3, shown is an example of a drawing of another perspective view of the mounting apparatus 100 where the inner assembly 106 has been rotated according to various embodiments of the present disclosure. In FIG. 3, the position of the sensor mount assembly 124 along the x-axis and y-axis has been rotated from the position shown in FIGS. 1 and 2. Specifically, the inner assembly 106 is secured in place at different x-rotation holes 115 on the circular frame 103. In changing the orientation along the x-axis, the x-mounting pins 136 were removed and the inner assembly was repositioned along the x-axis by sliding the first slide member 118 and the second slide member 121 along the inner guide slot 112 so that the x-mounting holes 133 are aligned with the appropriate x-rotation holes 115. According to various embodiments, the x-mounting holes 133 of the first slide member 118 and the second slide member 121 are aligned with respective x-rotation holes 115 of the circular frame 103. Accordingly, the x-axis position of the inner assembly 106 is secured in place on the circular frame 103 via the one or more x-mounting pins 136 being inserted through both the x-mounting holes 133 and the respective x-rotation holes 115.

In FIG. 3, the orientation of the sensor mount assembly 124 along the y-axis has also been rotated from the orientation shown in FIGS. 1 and 2. To modify the orientation of the sensor mount assembly 124 along the y-axis as shown in FIG. 3, the y-mounting pin 175 may be removed to allow rotation of the y-axis assembly 127 along the y-axis. During rotation, the y-mounting hole 172 may be aligned with a different y-rotation hole 139. The new orientation is secured by use of the y-mounting pin 175 which is inserted into the y-mounting hole 172 and the different y-rotation hole 139.

Figure 4A:
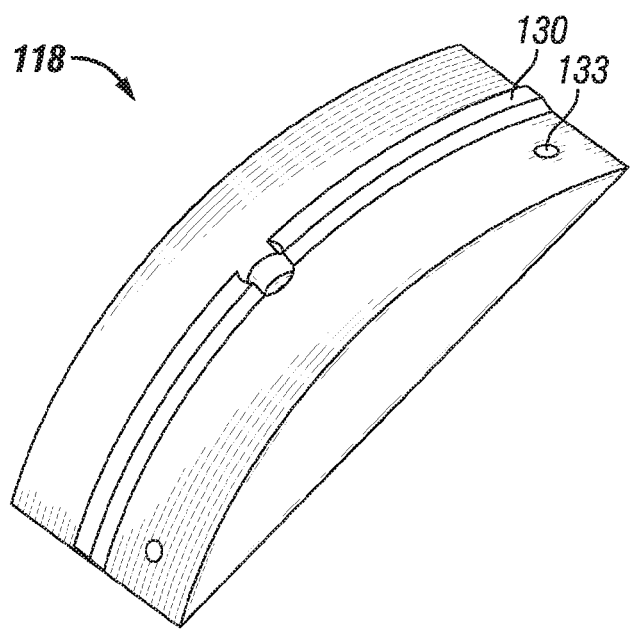
FIG. 4A is a drawing of an example of the first slide member of the mounting apparatus of FIG. 1 according to various embodiments of the present disclosure.
Figure 4B:
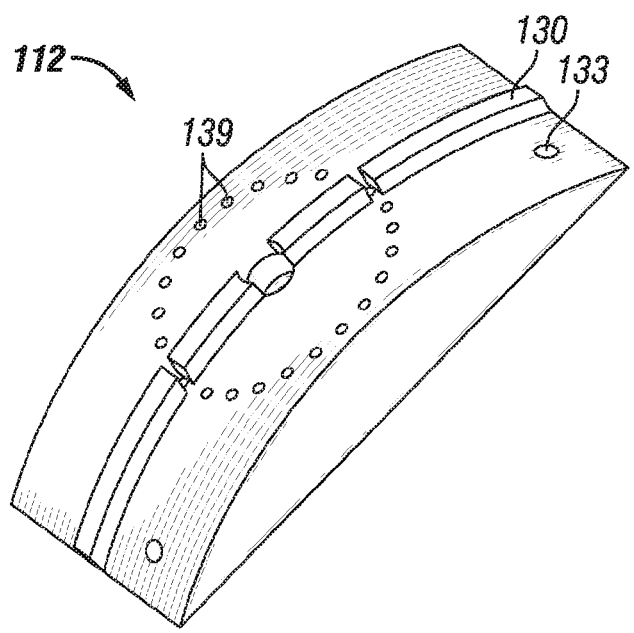
FIG. 4B is a drawing of an example of the second slide member of the mounting apparatus of FIG. 1 according to various embodiments of the present disclosure.

Turning now to FIGS. 4A and 4B, shown are examples of drawings of the convex surface of the first slide member 118 and the convex surface of the second slide member 121 according to various embodiments of the present disclosure. As shown in FIG. 4A, the first slide member 118 of inner assembly 106 comprises the male slot 130 for engaging with the inner guide slot 112 (FIG. 1) of the circular frame 103 (FIG. 1) of the mounting apparatus 100. FIG. 4B illustrates the male slot 130 on the second slide member 121. In addition, FIG. 4B shows the plurality of y-rotation holes 139 in a circular configuration.

Figure 5:
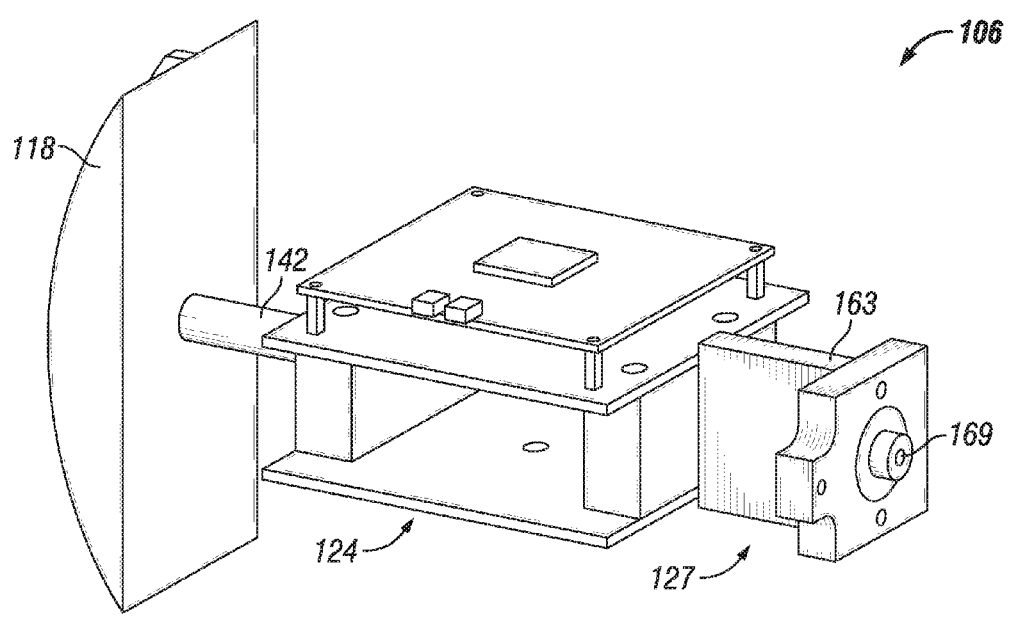
FIG. 5 is a drawing of an example of a portion of the inner assembly of the mounting apparatus of FIG. 1 according to various embodiments of the present disclosure.

Referring next to FIG. 5, shown is an example of a drawing of a perspective view of a portion of inner assembly 106 of the mounting apparatus 100 according to various embodiments of the present disclosure. FIG. 5 illustrates the y-axis assembly 127 coupled to the sensor mount assembly 124. To allow for smooth rotation along the y-axis, the inner assembly 106 comprises a first ball bearing 145 (FIG. 1) and a second ball bearing 169. In various embodiments, the first ball bearing 145 may be disposed between the shaft 142 extending from the first slide member 118 and the first side 154 of the sensor mount assembly 124. In various embodiments, the second ball bearing 169 can protrude outwardly from the outer surface of the second member 166 of the y-axis assembly 127. According to various embodiments, the y-axis assembly 127 can be coupled to the second slide member 121 via the second ball bearing 169.

Figure 6:
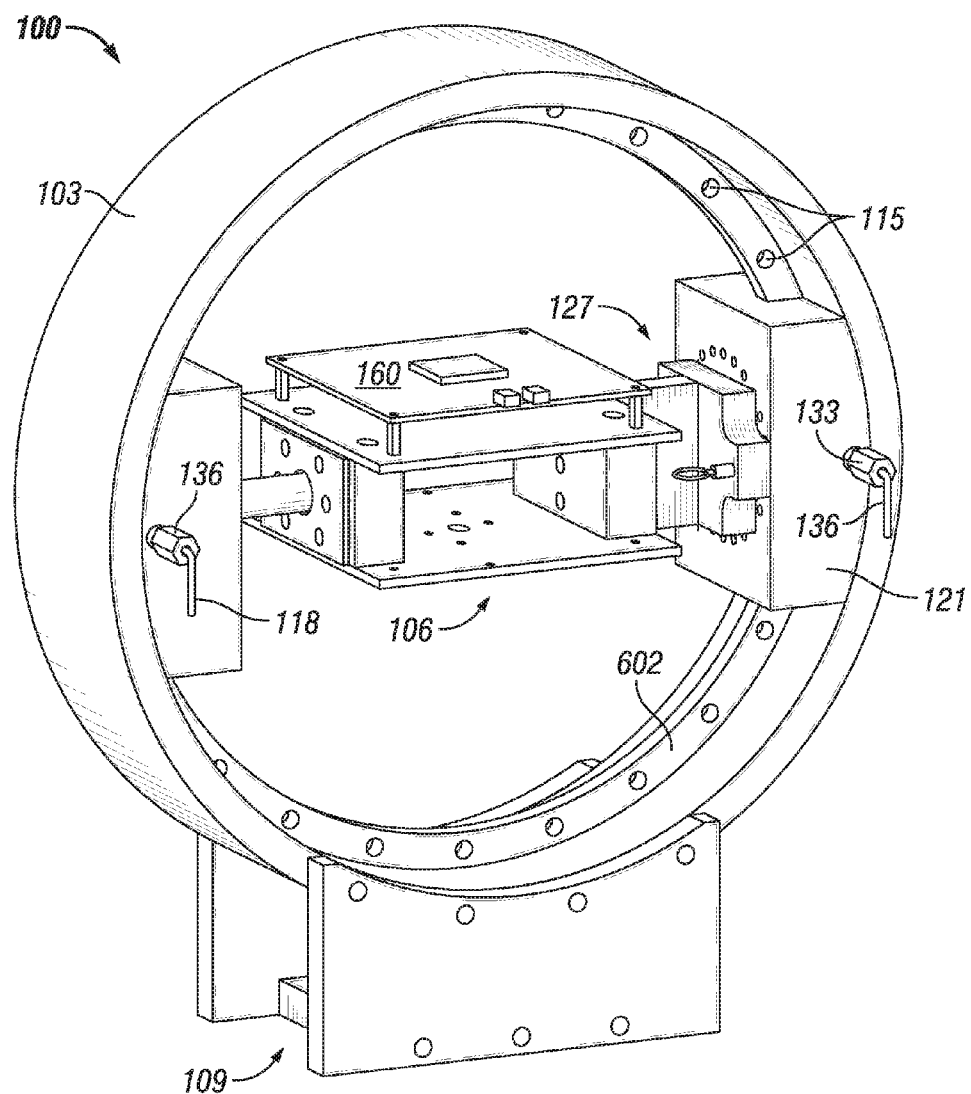
FIG. 6 is a drawing of an example of a perspective view of the mounting apparatus according to various embodiments of the present disclosure.

Moving on to FIG. 6, shown is an example of a drawing of a perspective view of the mounting apparatus 100 according to various embodiments of the present disclosure. The mounting apparatus 100 shown in FIG. 6 differs from the mounting apparatus 100 shown in FIG. 1 according to how the inner assembly 106 rotates along the x-axis of the mounting apparatus 100. The mounting apparatus 100 of FIG. 6 comprises a circular frame 103, an inner assembly 106, and a table mount bracket 109. According to various embodiments, the circular frame 103 is ring-shaped comprising an inner surface and an outer surface. A ring-shaped track 602 is coupled to and extends outwardly from to the inner surface of the circular frame 103. The ring-shaped track 602 is positioned along the entire circumference of the inner surface of the circular frame 103. The ring-shaped track 602 comprises a plurality of x-rotation holes 115 spaced along the side portions of the ring-shaped track 602. In some embodiments, the x-rotation holes 115 are evenly spaced (e.g., 15 degree iterations, etc.). In other embodiments, the x-rotation holes 115 are not evenly spaced.

The inner assembly 106 of FIG. 6 differs from the inner assembly 106 of FIG. 1 in that the first slide member 118 and the second slide member 121 each comprise a respective slot 604 recessed within the convex surface of the first slide member 118 and the second slide member 121 and extending from a respective top surface to a respective bottom surface. Accordingly, the respective slots 604 of the first slide member 118 and the second slide member 121 are engaged with the ring-shaped track 602 on the circular frame 103. In addition, the first slide member 118 and the second slide member 121 of FIG. 6 each comprise one or more x-mounting holes 133 extending from a respective first side to a respective second side of the respective slide member 118, 121. In various embodiments, the x-mounting holes 133 can be aligned with a respective x-rotation hole 115 of the ring-shaped track 602. Accordingly, the one or more x-mounting pins 136 can be inserted within the one or more x-mounting holes 133 and respective x-rotation holes 115 to secure the position of the inner assembly 106 along the circular frame 103.

The table mount bracket 109 is coupled to a portion of the circular frame. The table mount bracket 109 may comprise one or more side brackets 178 coupled to at least one side of the portion of the circular frame 103. The table mount bracket 109 may further comprise a bottom bracket 181 (FIG. 2) disposed between the one or more side brackets 178. The bottom bracket 181 may be used to mount the mounting apparatus 100 to a single-axis rate table (not shown). The size and shape of the table mount bracket 109 may be customized for various types of rate tables as can be appreciated. The rotation of the mounting apparatus 100 about the z-axis coincides with the rotation of the rate table.

Figure 7:
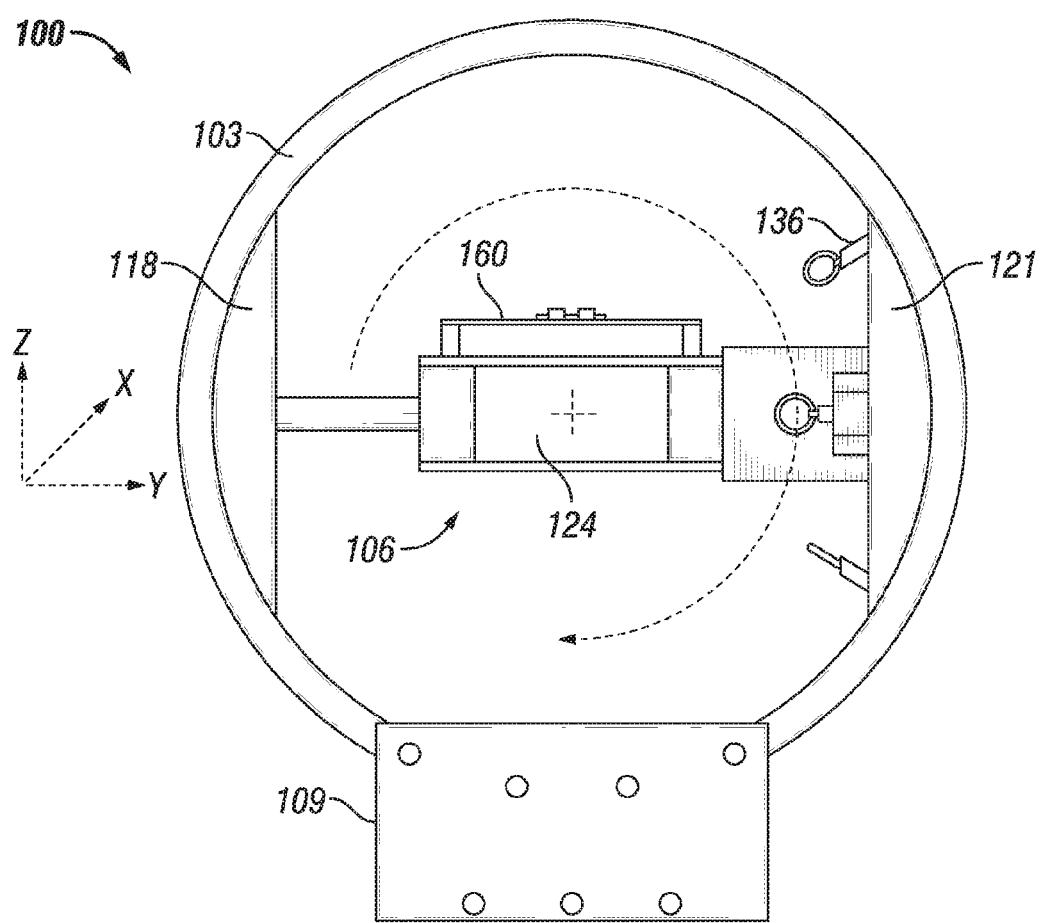
FIG. 7 is a drawing of an example of a front view of the mounting apparatus of FIG. 1 showing the rotation along the x-axis according to various embodiments of the present disclosure.

Turning now to FIG. 7, shown is an example of a front view of the mounting apparatus 100 illustrating a rotation of the inner assembly 106 along the x-axis according to various embodiments of the present disclosure. To rotate the inner assembly 106, and thus, the sensor mount assembly 124, about the x-axis of the mounting apparatus 100, the one or more x-mounting pins 136 securing the inner assembly 106 to a particular position along the circular frame 103 may be unlocked and/or removed. If there are multiple x-mounting pins 136, all of the x-mounting pins 136 must be unlocked and/or removed from the x-rotation holes 115 before rotation along the x-axis is possible. In one non-limiting example, the x-rotation holes 115 may be spaced every fifteen degrees in the configuration, as shown in FIG. 1. In this non-limiting configuration, the mounting apparatus 100 of FIG. 1 is capable of locking in positions along the x-axis at every fifteen degrees for a full rotation of 360 degrees. However, as previously noted, the configuration of the x-rotation holes 115 is not limited to fifteen degree increments. As such, there may be more or less than twenty-four x-rotation holes 115 along the circular frame 103.

To allow for rotation along the x-axis, the respective male slots 130 (FIGS. 4A-4B) on the first slide member 118 and the second slide member 121 of the inner assembly 106 may mate with the inner guide slot 112 (FIG. 1) and slide along the circumference of the circular frame 103 via the inner guide slot 112. In some embodiments, the inner guide slot 112 can be greased to allow for ease of rotation along the x-axis. The inner guide slot 112 can limit rotation of the inner assembly 106 along any other axis (e.g., y-axis, z-axis) when rotating along the x-axis. In addition, the inner guide slot 112 holds the inner assembly 106 in the circular frame 103 during testing. It should be noted that while the mounting apparatus 100 of FIG. 1 and the mounting apparatus 100 of FIG. 6 differ in structure for rotating along the x-axis, the rotation along the x-axis is the same.

Figure 8:
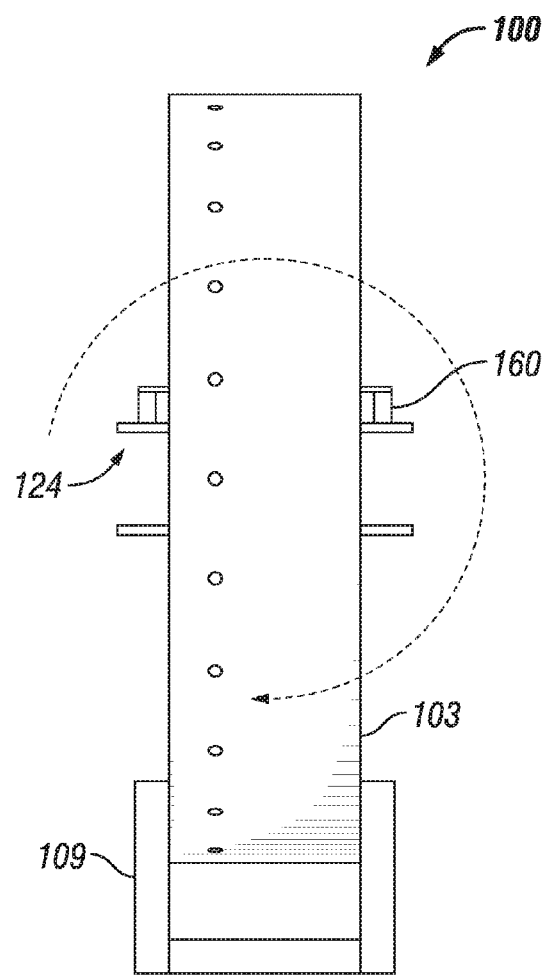
FIG. 8 is a drawing of an example of a side view of the mounting apparatus of FIG. 1 showing the rotation along the y-axis according to various embodiments of the present disclosure.

Referring next to FIG. 8, shown is an example of a drawing of a side view of the mounting apparatus 100 illustrating a rotation of the sensor mount assembly 124 along the y-axis of the mounting apparatus 100 according to various embodiments of the present disclosure. Rotation about the y-axis of the mounting apparatus 100 occurs by removing and/or unlocking the y-mounting pin 175 and rotating the y-axis assembly 127 (and sensor mount assembly 124) to align the y-mounting hole 172 with a different y-rotation hole 139. When the desired alignment is reached, the y-mounting pin 175 can be inserted into the y-mounting hole 172 and the different y-rotation hole 139 to secure the position. For the configuration shown in FIG. 1 where the y-rotation holes 139 are spaced at fifteen degree increments, the y-axis assembly 127 (and sensor mount assembly 124) may be rotated along the y-axis every fifteen degrees for a full 360 degree rotation. To allow for smooth rotation in y-axis, a first ball bearing 145 and a second ball bearing 169 may be used in the assembly of the inner assembly 106 as discussed with respect to FIGS. 1 and 5. It should be noted that while the mounting apparatus 100 of FIG. 1 and the mounting apparatus 100 of FIG. 6 differ in structure for rotating along the x-axis, the rotation along the y-axis is the same.

Figure 9:
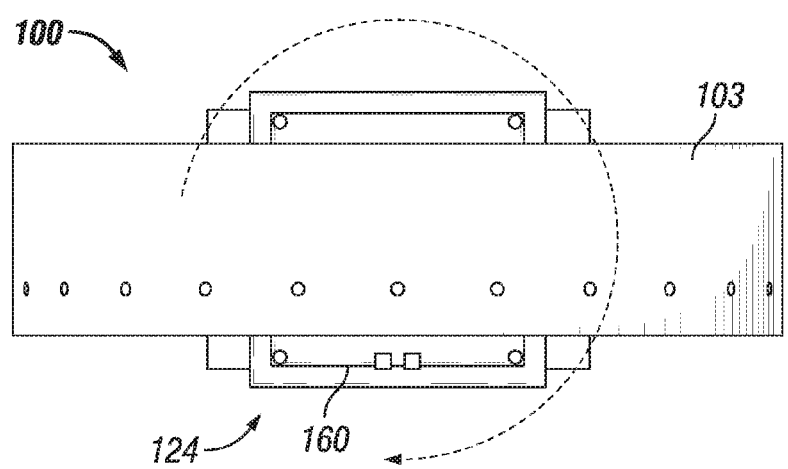
FIG. 9 is a drawing of an example of a top view of the mounting apparatus of FIG. 1 showing the rotation along the z-axis according to various embodiments of the present disclosure.

Turning now to FIG. 9, shown is an example of a drawing of a top view of the mounting apparatus 100 illustrating rotation of the mounting apparatus 100 along the z-axis of the mounting apparatus 100 according to various embodiments of the present disclosure. The z-axis rotation is stimulated by the rotation of a rate table (not shown) attached to the mounting apparatus 100. When the rate table is spun at a known rate, the entire mounting apparatus 100 will begin spinning counter-clockwise or clockwise as shown in FIG. 9. It should be noted that while the mounting apparatus 100 of FIG. 1 and the mounting apparatus 100 of FIG. 6 differ in structure for rotating along the x-axis, the rotations along the y-axis and z-axis are the same.

Figure 10:
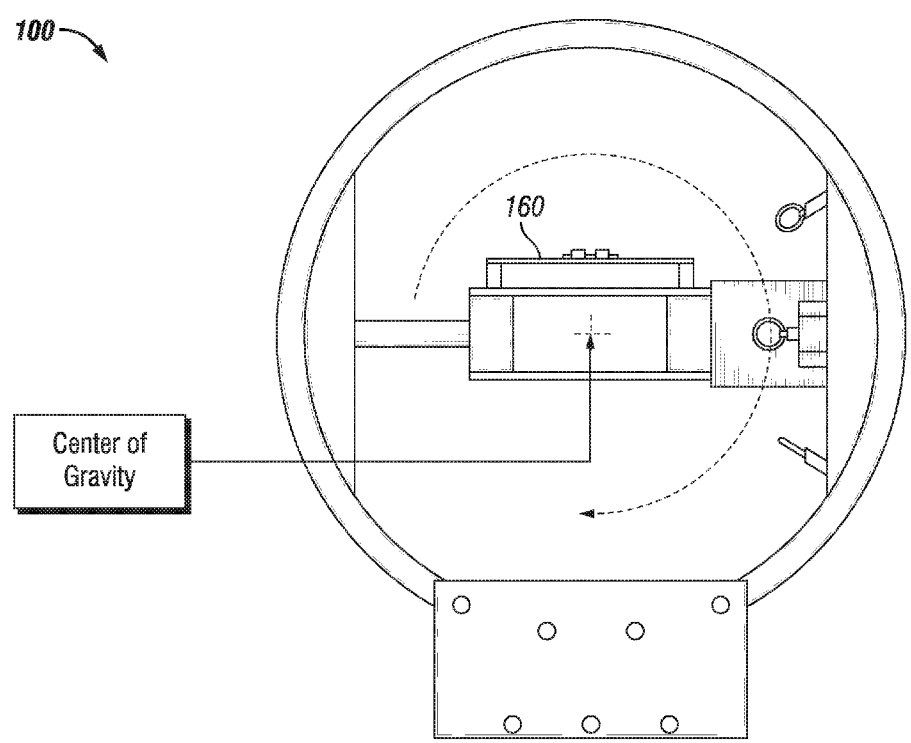
FIG. 10 is a drawing of an example of a front view of the mounting apparatus of FIG. 1 showing the center of gravity according to various embodiments of the present disclosure.

Moving on to FIG. 10, shown is an example of a front view of the mounting apparatus 100 of FIG. 1 according to various embodiments of the present disclosure. An important component of the mounting apparatus 100 is the center of gravity (CG) of the mounting apparatus. The CG must be kept very near the axis of rotation of the rate table. If the CG is not near the axis of rotation there is a moment arm that may cause wobble during testing. Any wobble or vibrations in the table are unwanted and may corrupt sensor calibration. The CG is shown in FIG. 10 by the cross shown between the top plate 148 (FIG. 1) and the bottom plate 151 (FIG. 1) of the sensor mount assembly 124 of the mounting apparatus 100. The CG is about 0.1" to the right of the center of rotation. In order to prevent the sensor package 160 (FIG. 1) coupled to the sensor mount assembly 124 from wobbling during rotation, the center of gravity of the mounting apparatus 100 may be adjusted using balancing weights (not shown) for alignment with the axis of rotation of the rate table. In some embodiments, a small tapped hole 201 (FIG. 1) on the bottom plate 151 of the sensor mount assembly 124 can be configured to receive small weights to compensate for the sensor weight.

Figure 11:
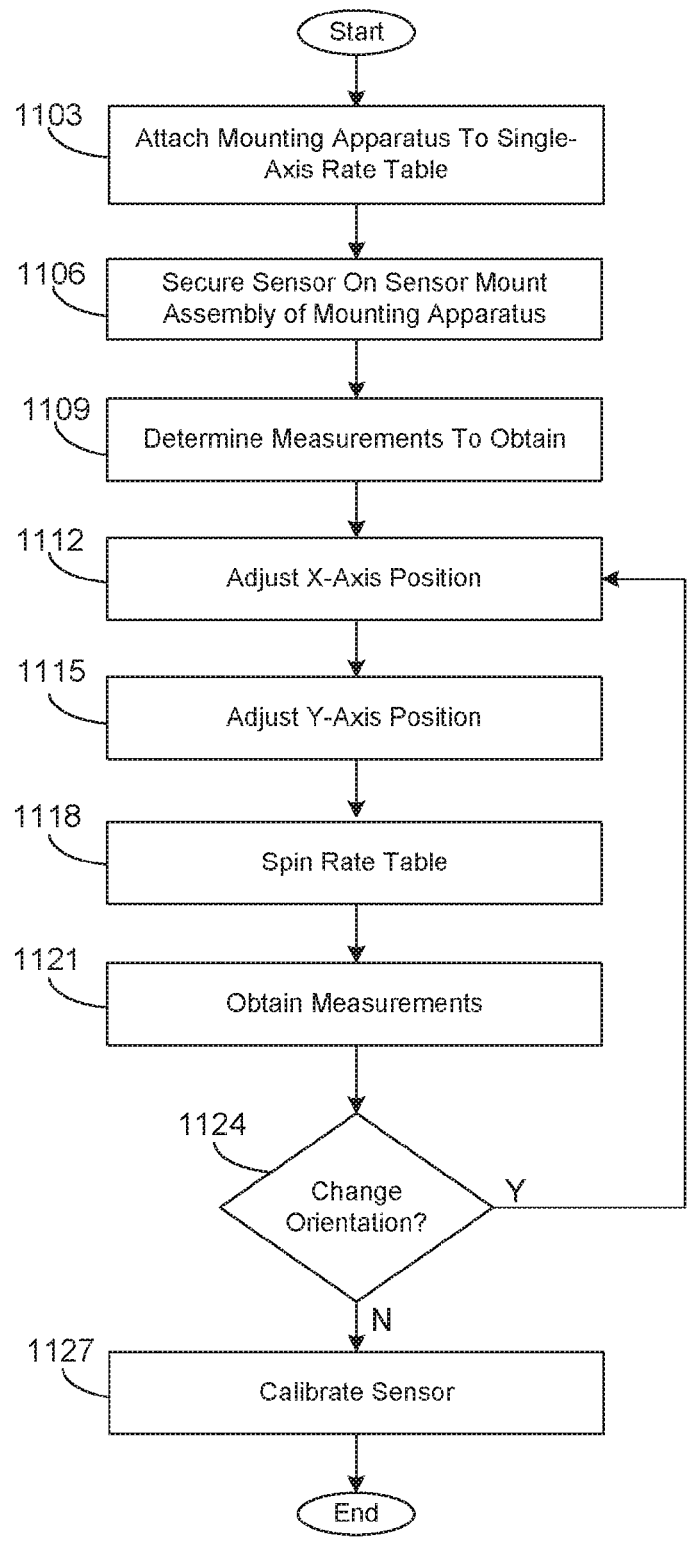
FIG. 11 is a flowchart illustrating one example of a method of calibrating an IMU sensor package using the mounting apparatus of FIGS. 1 and 6 according to various embodiments of the present disclosure.

Moving on to FIG. 11, shown is a flowchart that provides one example of a method for calibrating a mounting apparatus 100 mounted on a single-axis rate table (not shown). It is understood that the flowchart of FIG. 11 provides merely an example of the many different types of functional arrangements that may be employed to implement the operation of the methods as described herein.

At reference numeral 1103, the mounting apparatus 100 is mounted onto a single-axis rate table. The mounting apparatus 100 may be mounted onto the single-axis rate table via the table mounting bracket 109 and any appropriate hardware required to secure the table mounting bracket 109 of the mounting apparatus 100 on the single-axis rate table. At reference numeral 1106, the IMU sensor package 160 (FIG. 1) is secured on the sensor mount assembly 124 (FIG. 1) of the mounting apparatus 100. At reference numeral 1109, the required measurements to obtain are determined. The measurements may comprise x-axis accelerometer measurements, y-axis accelerometer measurements, z-axis accelerometer measurements, x-axis gyroscope measurements, y-axis gyroscope measurements, z-axis gyroscope measurements, sensor temperature, and/or any other type of measurement as can be appreciated. The required measurements may be determined arbitrarily or may be determined based on previous measurements, a predetermined set of orientations, a particular need, etc. At reference numeral 1112, the x-axis position of the sensor package 160 is adjusted according to a desired position for a desired measurement. Accordingly, if the one or more x-mounting pins 136 are inserted to the x-mounting holes 133 and the respective x-rotation holes 115, the one or more x-mounting pins 136 are removed and/or unlocked. The inner assembly 106 is rotated to the desired position such that the x-mounting holes 133 on the first slide member 118 and/or the second slide member 121 are aligned with the desired x-rotation holes 115 of the circular frame 103 of the mounting apparatus 100. Once proper alignment has occurred, the one or more x-mounting pins 136 are inserted into the one or more x-mounting holes 133 and desired x-rotation holes 115 to secure the new position along the x-axis.

At reference numeral 1115, the y-axis position of the sensor package 160 is adjusted according to a desired measurement. If the y-mounting pin 175 is inserted in the y-mounting hole 172 and a respective y-rotation hole 139, the y-mounting pin 175 is removed and/or unlocked. Then the y-axis assembly 127, and thus the sensor mount assembly 124 holding the sensor package 160, is rotated to align the y-mounting hole 172 with the desired y-rotation hole 139. Once aligned, the y-mounting pin 175 is inserted into the y-mounting hole 172 and the desired y-rotation hole 139 to secure the desired y-axis position of the sensor package 160.

At reference numeral 1118, the rate table is spun. The z-axis rotation of the mounting apparatus 100 coincides with the rotation of the rate table. At reference numeral 1121, the measurements are obtained that correspond to the configured orientation of the sensor package 160. At reference numeral 1124, it is determined whether the orientation is to be changed to obtain additional measurements. If measurements at an alternate orientation are desired, the method may proceed to reference numeral 1112. At reference numeral 1127 the sensor package 160 may be calibrated according to the obtained measurements.

Although the flowchart of FIG. 11 shows a specific order of execution, it is understood that the order of execution may differ from that which is depicted. For example, the order of execution of two or more steps may be scrambled relative to the order shown. Also, two or more steps shown in succession in FIG. 11 may be executed concurrently or with partial concurrence. Further, in some embodiments, one or more of the blocks shown in FIG. 11 may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A mounting apparatus for calibrating a sensor package using a single-axis rate table, the mounting apparatus comprising:
   a circular frame;
   an inner assembly slidably coupled to the circular frame and extending along a diameter of the circular frame, the inner assembly being configured to secure the sensor package, and rotation of the inner assembly about an inner circumference of the circular frame corresponding to an x-axis position of the sensor package; and
   a bracket mount attached to a portion of the circular frame, the bracket mount being configured for mounting the mounting apparatus onto the single-axis rate table.

2. The mounting apparatus of claim 1, wherein the circular frame comprises a plurality of x-rotation holes positioned around the inner circumference of the circular frame.

3. The mounting apparatus of claim 2, wherein the plurality of x-rotation holes are uniformly spaced along the inner circumference of the circular frame.

4. The mounting apparatus of claim 2, wherein a position of the inner assembly along the circular frame is based at least in part on one or more of the plurality of x-rotation holes, the inner assembly being secured to the circular frame at the position via one or more x-mounting pins inserted into one or more x-mounting holes on the inner assembly aligned with the one or more of the plurality of x-rotation holes, the one or more x-mounting pins extending into the one or more of the plurality of x-rotation holes.

5. The mounting apparatus of claim 1, wherein the rotation of the mounting apparatus about a z-axis coincides with rotation of the single-axis rate table.

6. The mounting apparatus of claim 1, wherein the inner assembly comprises a first slide member and a second slide member, the first slide member being slidably coupled to the circular frame at a first location and the second slide member being slidably coupled to the circular frame at a second location, the first location being opposite of the second location.

7. The mounting apparatus of claim 6, wherein the inner assembly further comprises a sensor mount assembly coupled to a y-axis assembly, the y-axis assembly being rotationally coupled to the second slide member.

8. The mounting apparatus of claim 7, wherein a y-axis rotation of the sensor package corresponds to a rotation of the y-axis assembly about the second slide member.

9. The mounting apparatus of claim 7, wherein the second slide member comprises a plurality of y-rotation holes spaced in a circular configuration, wherein a y-axis orientation of the sensor mount is based at least in part on an alignment of a y-mounting hole on the y-axis assembly with a respective y-rotation hole.

10. The mounting apparatus of claim 1, wherein the sensor comprises a three-axis Inertial Measurement Unit (IMU) sensor package.

11. A method, comprising:
attaching a mounting apparatus comprising a sensor to a single-axis rate table;
adjusting an x-axis position of the sensor by rotating an inner assembly along a circumference of a circular frame of the mounting apparatus, the sensor being mounted to the inner assembly;
adjusting a y-axis position of the sensor by rotating a portion of the inner assembly, the sensor being coupled to the portion of the inner assembly; and
spinning the single-axis rate table to generate z-axis rotation of the mounting apparatus and stimulating a combination of the x-axis, y-axis, and z-axis of the sensor based at least in part on the x-axis position, the y-axis position, and the z-axis rotation.

12. The method of claim 11, further comprising obtaining one or more measurements from the sensor corresponding to the x-axis position, the y-axis position, and the z-axis rotation of the mounting apparatus.

13. The method of claim 12, wherein the one or more measurements comprise at least one of an x-axis accelerometer measurement, a y-axis accelerometer measurement, a z-axis accelerometer measurement, an x-axis gyroscope measurement, a y-axis gyroscope measurement, a z-axis gyroscope measurement, or a sensor package temperature measurement.

14. The method of claim 11, wherein the inner assembly is slidably coupled to an inner surface of the circular frame.

15. The method of claim 11, further comprising aligning one or more x-mounting holes on the inner assembly with one or more x-rotation holes on the circular frame, the one or more x-rotation holes being associated with the x-axis position.

16. The method of claim 15, further comprising securing the x-axis position by inserting one or more locking pins into the one or more x-mounting holes aligned with the one or more x-rotation holes on the inner assembly.

17. The method of claim 11, further comprising aligning a y-mounting hole on a y-axis assembly of the inner assembly with a specific y-rotation hole on a slide member of the inner assembly, the specific y-rotation hole being associated with the y-axis position.

18. The method of claim 17, further comprising securing the y-axis position by inserting a locking pin into the y-mounting hole and the specific y-rotation hole when the y-mounting hole is aligned with the specific y-rotation hole.

19. The method of claim 11, wherein the sensor comprises an Inertial Measurement Unit (IMU) sensor package.

20. An apparatus for calibrating a three axis Inertial Measurement Unit (IMU) sensor package on a single-axis rate table, the apparatus comprising:
means for rotating the IMU sensor package along an x-axis;
means for rotating the IMU sensor package along a y-axis; and
means for mounting the IMU sensor package to the single-axis rate table, the rotation of the IMU sensor package coinciding with rotation of the single-axis rate table and resulting an a controlled and simultaneous stimulation of all three axes of the IMU sensor package.

* * * * *